US011593434B2

(12) United States Patent
Niu et al.

(10) Patent No.: US 11,593,434 B2
(45) Date of Patent: Feb. 28, 2023

(54) SENTENCE RECOMMENDATION METHOD AND APPARATUS BASED ON ASSOCIATED POINTS OF INTEREST

(71) Applicant: BAIDU ONLINE NETWORK TECHNOLOGY (BEIJING) CO., LTD., Beijing (CN)

(72) Inventors: Zhengyu Niu, Beijing (CN); Hua Wu, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 488 days.

(21) Appl. No.: 16/819,969

(22) Filed: Mar. 16, 2020

(65) Prior Publication Data

US 2020/0311147 A1 Oct. 1, 2020

(30) Foreign Application Priority Data

Mar. 29, 2019 (CN) .......................... 201910252164.6

(51) Int. Cl.
*G06F 16/9032* (2019.01)
*G06F 40/56* (2020.01)
*G10L 15/22* (2006.01)

(52) U.S. Cl.
CPC ........ *G06F 16/90332* (2019.01); *G06F 40/56* (2020.01); *G10L 15/22* (2013.01)

(58) Field of Classification Search
None
See application file for complete search history.

(56) References Cited

U.S. PATENT DOCUMENTS

| | | | |
|---|---|---|---|
| 8,190,628 B1 * | 5/2012 | Yang ..................... | G06F 40/289 704/10 |
| 2011/0314018 A1 * | 12/2011 | Bieniosek ............. | G06F 16/353 707/E17.046 |

(Continued)

FOREIGN PATENT DOCUMENTS

| | | |
|---|---|---|
| CN | 1647069 A | 7/2005 |
| CN | 104281622 A | 1/2015 |

(Continued)

OTHER PUBLICATIONS

Office Action for Chinese Application No. 201910252164.6, dated Aug. 19, 2020, 9 pages.

(Continued)

*Primary Examiner* — Nafiz E Hoque
(74) *Attorney, Agent, or Firm* — Lippes Mathias LLP

(57) ABSTRACT

The present disclosure provides a sentence recommendation method and apparatus based on associated points of interest. The method includes: obtaining an input sentence from a user; extracting a keyword in the input sentence, and searching for a current point of interest matching the keyword in a preset point of interest association network determining a plurality of associated points of interest matching the current point of interest according to the preset point of interest association network, and filtering out an extension point of interest from the plurality of associated points of interest according to a preset filter strategy; and retrieving a first reply sentence and a second reply sentence from a preset corpus according to the current point of interest and the extension point of interest, and providing them to the user.

17 Claims, 5 Drawing Sheets

(56) References Cited

U.S. PATENT DOCUMENTS

| | | | | |
|---|---|---|---|---|
| 2012/0296917 A1* | 11/2012 | Osentoski | ........... | G06F 16/3329 |
| | | | | 707/748 |
| 2016/0103884 A1* | 4/2016 | Clifford | ................ | G06F 16/951 |
| | | | | 707/724 |
| 2017/0004208 A1* | 1/2017 | Podder | .................... | G06F 40/30 |
| 2017/0083969 A1* | 3/2017 | Takeda | .................. | G06F 16/951 |
| 2019/0130900 A1* | 5/2019 | Tsai | .................... | G10L 15/1815 |

FOREIGN PATENT DOCUMENTS

| | | | |
|---|---|---|---|
| CN | 107003997 | A | 8/2017 |
| CN | 107203534 | A | 9/2017 |
| CN | 107832433 | A | 3/2018 |
| CN | 107832468 | A | 3/2018 |
| CN | 107943998 | A | 4/2018 |
| CN | 109086329 | A | 12/2018 |
| JP | 2004514219 | A | 5/2004 |
| JP | 2007515724 | A | 6/2007 |
| JP | 2014506357 | A | 3/2014 |
| JP | 6120927 | B2 | 4/2017 |
| JP | 2017518588 | A | 7/2017 |
| JP | 2018156273 | A | 10/2018 |
| WO | 2018097091 | A1 | 5/2018 |

OTHER PUBLICATIONS

Chen Gang et al., "Design of Web User Interest Association System", School of Management, Computer Technology and Development, vol. 24, No. 11, Nov. 2014, 6 pages (English Abstract).

Office Action for Chinese Patent No. 201910252164.8, dated Mar. 1, 2021, 5 pages.

Li WANG at al., "LSTM-Based Neural Network Framework for Next POI Recommendation", Computer Systems & Applications, 2018, 6 pages, Abstract.

Office Action for Japanese application No. 2020-030175, dated Feb. 2, 2021, 5 pages.

English translation of Office Action for Japanese application No. 2020-030175, dated Feb. 2, 2021, 6 pages.

Second Office Action for Chinese application No. 201910252164.6, dated Nov. 17, 2020, 7 pages.

English translation of Second Office Action for Chinese application No. 201910252164.6, dated Nov. 17, 2020, 16 pages.

* cited by examiner

SENTENCE RECOMMENDATION METHOD AND APPARATUS BASED ON ASSOCIATED POINTS OF INTEREST

CROSS REFERENCE TO RELATED APPLICATION

This application claims priority under 35 U.S.C. § 119(a) on Chinese Patent Application No. 201910252164.6, filed with the State Intellectual Property Office of P. R. China on Mar. 29, 2019, the entire contents of which are incorporated herein by reference.

TECHNICAL FIELD

The present disclosure relates to the field of artificial intelligence technology, and more particularly, to a sentence recommendation method and a sentence recommendation apparatus based on associated points of interest.

BACKGROUND

Currently, in a human-machine conversation scenario, a chat robot usually takes voice information of a user as an input, and automatically determines semantic content of the reply h analyzing the voice information in combination with a previous conversation history between them and user interest information.

However, the initial user interest information is usually specified by the user, or obtained from a short and brief interaction with the user. Accordingly, the initial user interest information may usually have an information granularity that is not fine enough, e.g., only at a level of special fields, such as entertainment and sports, and have coverage that is not wide enough. Additionally, the initial user interest information generally relies on the user's autonomous switching to a new topic, from which the user interest information may be extracted based on the dialogues with the user. Since the creation of topic is wholly dependent on the user, it tends to create to closed set of limited topics with an inefficient accumulation process, resulting in a narrower coverage of user interests.

SUMMARY

Embodiments of the present disclosure seek to solve at least one of the problems existing in the related art to at least some extent.

Accordingly, a first objective of the present disclosure is to provide a sentence recommendation method based on associated points of interest. The method finds out an extension point of interest according to associations among different points of interest, provides reply sentences containing the extension point of interest to the user, and then extends a set of points of interest for the user based on the user feedback, so as to expand interest personas of the user more efficiently, and improve the diversity of topics in the human-machine conversation.

A second objective of the present disclosure is to provide a sentence recommendation apparatus based on associated points of interest.

A third objective of the present disclosure is to provide a computer device.

A fourth objective of the present disclosure is to provide a non-transitory computer readable storage medium.

In order to achieve the above objectives, embodiments of a first aspect of the present disclosure provide a sentence recommendation method based on associated points of interest. The method includes: obtaining an input sentence from a user; extracting a keyword in the input sentence, and searching for a current point of interest matching the keyword in a preset point of interest association network; determining a plurality of associated points of interest matching the current point of interest according to the preset point of interest association network, and filtering out an extension point of interest from the plurality of associated points of interest according to a preset filter strategy; and retrieving a first reply sentence and a second reply sentence from a preset corpus according to the current point of interest and the extension point of interest, and providing them to the user.

In addition, the sentence recommendation method based on associated points of interest according to the embodiments of the present disclosure also has the following additional technical features.

Alternatively, prior to determining the plurality of associated points of interest matching the current point of interest according to the preset point of interest association network, and filtering out the extension point of interest from the plurality of associated points of interest according to the preset filter strategy, the method further includes: obtaining feedback on interest of the user; and determining whether a retrieval criteria for the extension point of interest is satisfied according to the feedback on interest.

Alternatively, prior to determining the plurality of associated points of interest matching the current point of interest according to the preset point of interest association network, and filtering out the extension point of interest from the plurality of associated points of interest according to the preset filter strategy, the method further includes: obtaining the number of rounds of talks during human-computer interaction; and determining that a retrieval criteria for the extension point of interest is satisfied when the number of rounds of talks is equal to or greater than a first preset threshold.

Alternatively, prior to extracting the keyword in the input sentence, and searching for the current point of interest matching the keyword in the preset point of interest association network, the method further includes: obtaining a plurality of sentences, and extracting a keyword in each sentence; and analyzing associations among the plurality of keywords, and constructing the preset point of interest association network by setting an association relationship for each of the keywords according to the associations.

Alternatively, filtering out the extension point of interest from the plurality of associated points of interest according to the preset filter strategy, further includes: obtaining a degree of similarity between the plurality of associated points of interest and a set of user interest, a degree of association between the plurality of associated points of interest and the current point of interest, a degree of dissimilarity between the plurality of associated points, of interest and a negative set of user interest, and a utilization rate of the plurality of associated points of interest; and filtering out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

Alternatively, retrieving the first reply sentence and the second reply sentence from the preset corpus according to the current point of interest and the extension point of interest, and providing them to the user, includes: obtaining a plurality of candidate sentences matching the input sentence from the preset corpus; filtering out the first reply sentence from the plurality of candidate sentences according to the current point of interest and providing it to the user; and filtering out the second reply sentence from the plurality of candidate sentences according to the extension point of interest and providing it to the user.

Alternatively, filtering out the second reply sentence from the plurality of candidate sentences according to the extension point of interest and providing it to the user, includes: calculating a degree of semantic similarity between the extension point of interest and the plurality of candidate sentences based on a preset semantic model; and sorting the plurality of candidate sentences according to the degree of semantic similarity, determining the second reply sentence from the plurality of candidate sentences according to the sorted result, and providing it to the user.

Alternatively, determining the second reply sentence from the plurality of candidate sentences according to the sorted result, and providing it to the user, includes: determining a candidate sentence at the top of the sorted result as the second reply sentence and providing it to the user; or determining a target candidate sentence with the sorted result equal to or greater than a second preset threshold and having a sentence length matching that of the input sentence, as the second reply sentence and providing it to the user.

Embodiments of a second aspect of the present disclosure provide a sentence recommendation apparatus based on associated points of interest. The device includes: a first obtaining module, configured to obtain an input sentence from a user; an extraction and matching module, configured to extract a keyword in the input sentence, and search for a current point of interest matching the keyword in a preset point of interest association network; a determination module, configured to determine a plurality of associated points of interest matching the current point of interest according to the preset point of interest association network; a filtering module, configured to filter out an extension point of interest from the plurality of associated points of interest according to a preset filter strategy; and a processing module, configured to retrieve a first reply sentence and a second reply sentence from a preset corpus according to the current point of interest and the extension point of interest, and to provide them to the user.

In addition, the sentence recommendation apparatus based on associated points of interest according to the embodiments of the present disclosure also has the following additional technical features.

Alternatively, the device includes: a second obtaining module, configured to obtain feedback on interest of the user; and a first determination module, configured to determine whether a retrieval criteria for the extension point of interest is satisfied according to the feedback on interest.

Alternatively, the device includes: a third obtaining module, configured to obtain the number of rounds of talks during human-computer interaction; and a second determination module, configured to determine that a retrieval criteria for the extension point of interest is satisfied when the number of rounds of talks is equal to or greater than a first preset threshold.

Alternatively, the device includes: a fourth obtaining module, configured to obtain a plurality of sentences, and extract a keyword in each sentence; and a construction module, configured to analyze associations among the plurality of keywords, and constructing the preset point of interest association network by setting an association relationship for each of the keywords according to the associations.

Alternatively, the filtering module is configured to: obtain a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest; and filter out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

Alternatively, the processing module includes: a matching unit, configured to obtain a plurality of candidate sentences matching the input sentence from the preset corpus; a processing unit, configured to filter out the first reply sentence from the plurality of candidate sentences according to the current point of interest and to provide it to the user; and wherein the processing unit is configured to filter out the second reply sentence from the plurality of candidate sentences according to the extension point of interest and to provide it to the user.

Alternatively, the processing unit is configured to: calculate a degree of semantic similarity between the extension point of interest and the plurality of candidate sentences based on a preset semantic model; and sort the plurality of candidate sentences according to the degree of semantic similarity, determine the second reply sentence from the plurality of candidate sentences according to the sorted result, and provide it to the user.

Alternatively, the processing unit is configured to: determine a candidate sentence at the top of the sorted result as the second reply sentence and provide it to the user; or determine a target candidate sentence with the sorted result equal to or greater than a second preset threshold and having a sentence length matching that of the input sentence, as the second reply sentence and provide it to the user.

Embodiments of a third aspect provides a computer device, including: a memory, a processor, and a computer program stored on the memory and operable on the processor, wherein when the computer program is executed by the processor, the sentence recommendation method based on associated points of interest according to embodiments of the first aspect is implemented.

Embodiments of a fourth aspect provides a non-transitory computer readable storage medium having a computer program stored thereon, wherein the computer program is executed by the processor, the sentence recommendation method based on associated points of interest according to embodiments of the first aspect is implemented.

The technical solution according to the embodiments of the present disclosure may include the following beneficial effects. By obtaining an input sentence from a user; extracting a keyword in the input sentence, and searching for a current point of interest matching the keyword in a preset point of interest association network: determining a plurality of associated points of interest matching the current point of interest according to the preset point of interest association network, and filtering out an extension point of interest from the plurality of associated points of interest according to a preset filter strategy; and retrieving a first reply sentence and a second reply sentence from a preset corpus according to the current point of interest and the extension point of interest, and providing them to the user, the technical solution according to the embodiments of the present disclosure may find out an extension point of interest according to associations among different points of interest, provide reply sentences containing the extension point of interest to the user, and then extend a set of points of interest for the user based on the user feedback, so as to expand interest personas of the user more efficiently, and improve the diversity of topics in the human-machine conversation.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
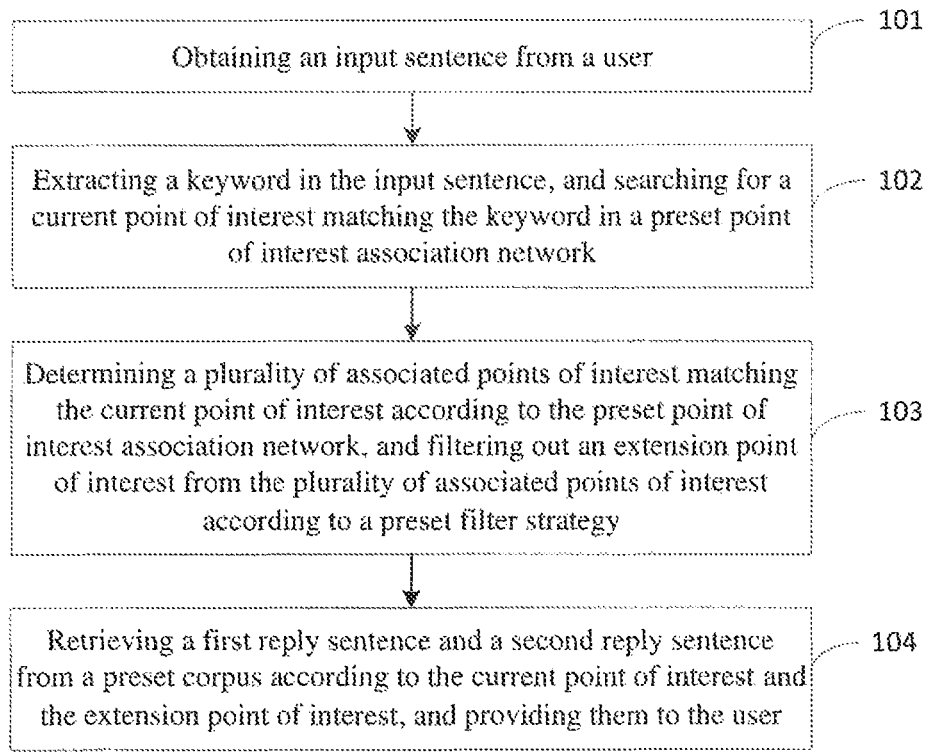
FIG. 1 is a flowchart of a sentence recommendation method based on associated points of interest according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A sentence recommendation method and apparatus based on associated points of interest according to the embodiments of the present disclosure will be described below with reference to the accompanying drawings.

As mentioned in the background, the creation of topic is wholly dependent on the user during human-machine conversation in the prior art, it tends to create a closed set of limited topics with an inefficient accumulation process, resulting in a technical problem of narrower coverage of user interests. On the other hand, the present disclosure proposes a sentence recommendation method, which extracts a keyword in the input sentence, searches for a current point of interest matching the keyword in a preset point of interest association network, determines a plurality of associated points of interest matching the current point of interest according to the preset point of interest association network, filters out an extension point of interest from the plurality of associated points of interest according to a preset filter strategy, retrieves a first reply sentence and a second reply sentence from a preset corpus according to the current point of interest and the extension point of interest, and provides diem to the user.

Specifically, FIG. 1 illustrates a flowchart of a sentence recommendation method based on associated points of interest according to an embodiment of the present disclosure. As illustrated in FIG. 1, the method includes the following steps.

At step 101, an input sentence is obtained from a user.

At step 102, a keyword in the input sentence is extracted, and a current point of interest matching the keyword is searched for in a preset point of interest association network.

In a practical application, the scenario in which the sentence recommendation method based on associated points of interest according to an embodiment of the present disclosure may be applied may include a scenario in which a conversation (i.e., a chat) is conducted with an intelligent system on a specific topic or a non-specific topic.

It can be understood that the intelligent system includes a Natural Language Understanding (NLU) module for understanding the input sentence from the user, a dialog management module for determining semantic contents in a reply, a Natural Language Generation (NLG) module for generating a reply sentence, and a user interest management module for updating user information.

Specifically, the user may input a sentence as necessary, such as a text sentence input through a keyboard or the like, or a voice sentence input through a microphone or the like.

Figure 2:
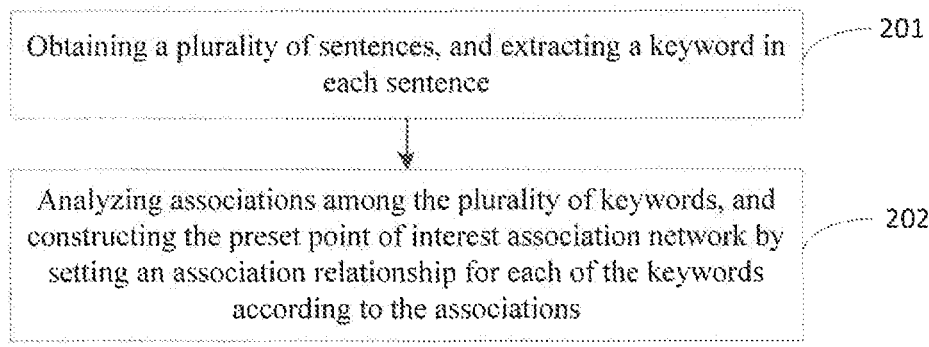
FIG. 2 is a flowchart of a sentence recommendation method based on associated points of interest according to another embodiment of the present disclosure.

Further, a keyword in the input sentence is extracted, and a current point of interest matching the keywords is searched for in a preset point of interest association network. The preset point of interest association network is created in advance. As an example, as illustrated in FIG. 2, creating the preset point of interest association network may include the following steps.

At step 201, a plurality of sentences is obtained, and a keyword is extracted in each of the sentences.

At step 202, associations among the plurality of keywords are analyzed, and the preset point of interest association network is constructed by setting an association relationship for each of the keywords according to the associations.

Specifically, the preset point of interest association network is of a directed graph structure including nodes and edges, wherein one node corresponds to one keyword (i.e., a point of interest), and one edge an additional direction, a weight, etc.) indicates a transition from one keyword to another keyword.

Here, the plurality of sentences may be sentences in a human-human conversation, or may originate from a search, an encyclopedia entry and the like. Further, the edge or transition between the keywords may originate from a transition from a sentence A to a sentence B in each round of talks, e.g., a transition from a keyword in the sentence A to a keyword in the sentence B, or may originate from other data sources, e.g., a conversion from a searching sentence C to a searching sentence ID in the same search.

For example, the plurality of sentences may originate from a plurality of sequentially adjacent sentences in a human-human conversation during a period of time. Then, the preset point of interest association network may be constructed by extracting a keyword in each of the sentences, analyzing associations among the keywords from the plurality of sentences, and setting an association relationship for each of the keywords according to the associations.

It should be noted that a corresponding weight may be given to each of the edges in the preset point of interest association network, for example, by calculating a conditional probability and using a transition probability from the keyword in the sentence A to the keyword in the sentence B as the corresponding weight.

Then, one or more keywords may be determined by performing a segmentation processing on the input sentence and analyzing the results. Then, a node matching the keywords is searched for in the preset point of interest association network as the current point of interest.

For example, an input sentence from the user is "I love songs of Andy Lau", from which keywords "Andy Lau" and "song" may be extracted. Then, the current points of interest matching those keywords "Andy Lau" and "song" may be retrieved in the preset point of interest association network as "Andy Lau", "songs of Andy Lau" and "song".

It should be noted that a corresponding confidence value may be applied to each current point of interest. For example, "Andy Lau" may have a confidence value of 0.6, while "songs of Andy Lan" may have a confidence value of 0.9. Applying the confidence value to the current point of interest may facilitate subsequent matching of reply sentences according to the current point of interest, thereby improving accuracy of the sentence recommendation and improving the user experience.

At step 103, a plurality of associated points of interest matching the current point of interest are determined according to the preset point of interest association network, and an extension point of interest is filtered out from the plurality of associated points of interest according to a preset filter strategy.

It can be understood that a plurality of associated points of interest matching the current point of interest may be determined according to the preset point of interest association network after the current point of interest is determined. More specifically, nodes that have been visited by traversing the edges originating from any current point of interest may be taken as the associated points of interest.

Further, an extension point of interest may be filtered out from the plurality of associated points of interest according to a preset filter strategy. It may be understood that the filter strategy may be chosen as necessary, such as a degree of association between the current point of interest and the associated points of interest, or a degree of association between the associated points of interest and the input sentence.

As a possible implementation, a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest may be obtained. Then, the extension point of interest may be filtered out from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

Here, the set of user interest refers to the user's interest preference, hobbies and the like, which may be consisting of a plurality of keywords. The negative set of user interest refers to those keywords that the user is not interested in.

At step 104, a first reply sentence and a second reply sentence are retrieved from a preset corpus according to the current point of interest and the extension point of interest, and provided to the user.

It can be understood that, there are many ways for retrieving the first reply sentence and the second reply sentence from the preset corpus according to the current point of interest and the extension point of interest and providing them to the user. For example, the first reply sentence may be retrieved from the preset corpus directly according to the current point of interest and provided to the user, and the second reply sentence may be retrieved from the preset corpus directly according to the extension point of interest and provided to the user. Alternatively, a plurality of candidate sentences matching the input sentence may be obtained from the preset corpus. Then, the first reply sentence may be filtered out from the plurality of candidate sentences according to the current point of interest and provided to the user, and the second reply sentence may be filtered out from the plurality of candidate sentences according to the extension point of interest and provided to the user.

Here, the plurality of candidate sentences matching the input sentence are obtained from the preset corpus. The plurality of candidate sentences are reply sentences matching the input sentence. More specifically, a plurality of candidate prompting sentences matching the input sentence may be obtained from the preset corpus. Then, reply sentences may be obtained for respective candidate prompting sentences as candidate reply sentences, i.e., the plurality of candidate sentences mentioned above.

It should be noted that, typically, it is only the first reply sentence for the current point of interest is obtained according to the input sentence from the user. The present disclosure may further retrieve the extension point of interest directly and actively, and retrieve the second reply sentence according to the extension point of interest directly on a basis of the first reply sentence for the current point of interest and then provide it to the user. In addition, the retrieving of the extension point of interest may be implemented depending on whether a preset retrieval criteria is satisfied. That is, prior to step 103, the method may further include: obtaining feedback on interest of the user, and determining whether a retrieval criteria for the extension point of interest is satisfied according to the feedback on interest.

Alternatively, the number of rounds of talks during human-computer interaction is obtained, and it is determined that a retrieval criteria for the extension point of interest is satisfied when the number of rounds of talks is equal to or greater than a first preset threshold.

Specifically, whether to retrieve the extension point of interest is determined by comprehensively considering the mining of implicit feedback information of the user (for example, the degree of interest) and the number of rounds of talks under current topic. If it is necessary to retrieve the extension point of interest, a second reply sentence is additionally generated according to the extension point of interest and provided to the user. In this way, for one input sentence, the system will output 2 reply sentences continuously.

To sum up, the sentence recommendation method based on associated points of interest according to the embodiments of the present disclosure may obtains an input sentence from a user, extracting a keyword in the input sentence, and searching for a current point of interest matching the keyword in a preset point of interest association network, determining a plurality of associated points of interest matching, the current point of interest according to the preset point of interest association network, and filtering out an extension point of interest from the plurality of associated points of interest according to a preset filter strategy, and retrieving a first reply sentence and a second reply sentence from a preset corpus according to the current point of interest and the extension point of interest, and providing them to the user. In this way, the sentence recommendation method based on associated points of interest according to the embodiments of the present disclosure may find out an extension point of interest according to associations among different points of interest, provide reply sentences containing the extension point of interest to the user, and then extend a set of points of interest for the user based on the user feedback, so as to expand interest personas of the user more efficiently, and improve the diversity of topics in the human-machine conversation.

Figure 3:
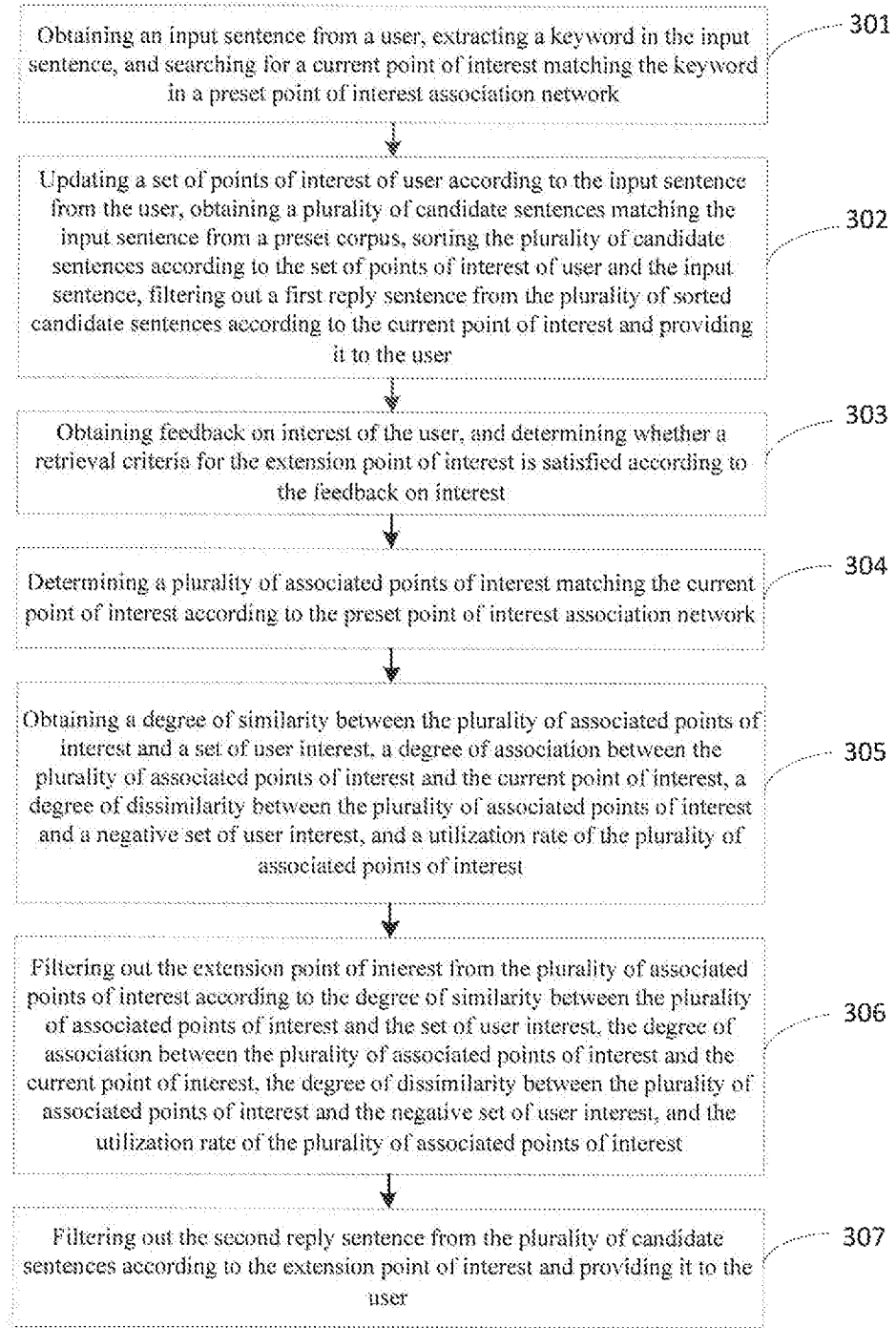
FIG. 3 is a flowchart of a sentence recommendation method based on associated points of interest according to a further embodiment of the present disclosure.

FIG. 3 illustrates a flowchart of a sentence recommendation method based on associated points of interest according to a further embodiment of the present disclosure. As illustrated in FIG. 3, the method further includes the following steps.

At step 301, an input sentence from a user is obtained, and a keyword in the input sentence is extracted, and a current point of interest matching the keyword is searched for in a preset point of interest association network.

It should be noted that the description for step 301 may refer to those for steps 101-102, details of which are hence omitted here.

At step 302, a set of points of interest of user is updated according to the input sentence from the user, and a plurality of candidate sentences matching the input sentence are obtained from a preset corpus and are sorted according to the set of points of interest of user and the input sentence, and a first reply sentence is filtered out from the plurality of sorted candidate sentences according to the current point of interest and provided to the user.

It can be understood that the set of points of interest of user is obtained by analyzing the input sentence from the user, and may be a set of one or more keywords representing the points of interest of the user. In each round of talk, the input sentence from the user is analyzed to obtain a point of interest of the user. Then, it is determined whether the point of interest is included in the set of point of interest of the user. If not, the point of interest may be added to the set of point of interest of the user.

Here, a dialog matching degree between the input sentence and the plurality of candidate sentences may be calculated based on a dialog matching model. A degree of semantic similarity between the set of points of interest of user and the plurality of candidate sentences may be calculated based on a preset semantic model. Then, the plurality of candidate sentences may be sorted according to the dialog matching degree and the degree of semantic similarity. Then, the first reply sentence may be determined according to the sorted result in combination with the current point of interest and provided to the user.

That is, the plurality of candidate sentences may be processed by using a candidate sentence at the top of the sorted result as the first reply sentence directly or using other strategies. For example, a candidate sentence having a length similar to that of the input sentence may be used as the first reply sentence. Alternatively, a candidate sentence may be selected randomly as the first reply sentence so as to improve the diversity.

At step 303, feedback on interest of the user is obtained, and whether a retrieval criteria for the extension point of interest is satisfied is determined according to the feedback on interest.

Specifically, if it is determined according to the feedback on interest that the user has less interest in the current topic, the extension point of interest may be further retrieved. On the other hand, if it is determined that the user is very interested in the current topic, the extension point of interest would not be retrieved.

At step 304, a plurality of associated points of interest matching the current point of interest is determined according to the preset point of interest association network.

At step 305, a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest are obtained.

At step 306, the extension point of interest is filtered out from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

Here, the plurality of associated points of interest may be sorted according to one or more of the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest. The associated point of interest at the top of the sorted result is taken as the extension point of interest.

At step 307, the second reply sentence is filtered out from the plurality of candidate sentences according to the extension point of interest and provided to the user.

Here, filtering out the second reply sentence from the plurality of candidate sentences according to the extension point of interest and providing it to the user includes: calculating a degree of semantic similarity between the extension point of interest and the plurality of candidate sentences based on a preset semantic model; and sorting the plurality of candidate sentences according to the degree of semantic similarity, determining the second reply sentence from the plurality of candidate sentences according to the sorted result, and providing it to the user.

Further, determining the second reply sentence from the plurality of candidate sentences according to the sorted result and providing it to the user includes: determining a candidate sentence at the top of the sorted result as the second reply sentence and providing it to the user; or determining a target candidate sentence with the sorted result equal to or greater than a second preset threshold and having a sentence length matching that of the input sentence, as the second reply sentence and providing it to the user.

That is, the plurality of candidate sentences may be processed by using a candidate sentence at the top of the sorted result as the second reply sentence directly or using other strategies. For example, a candidate sentence having a length similar to that of the input sentence may be used as the second reply sentence. Alternatively, a candidate sentence may be selected randomly as the second reply sentence so as to improve the diversity.

As an exemplary scenario, the user may enter "I like the movie "Lost On Journey", especially the role Wang Baoqiang played in it", from which the current points of interest are obtained as "Lost On Journey" and "Wang Baoqiang". Then, according to the preset point of interest association network, i.e., "Wang Baoqiang"→"Huang Bo"→"Inspirational movies", the extension point of interest is determined as an inspirational movie. Based on the extension point of interest, a reply sentence may be generated as "Well, I have seen "Egg Fried Rice"! The story of Wang Dawei in it is very inspirational and touching!" In this way, the diversity of topics in human-machine dialogue may be improved, and the user experience may be enhanced.

Consequently, the present disclosure may find out the extension point of interest according to associations among different points of interest, provide reply sentences containing the extension point of interest to the user, and then extends a set of points of interest for the user based on the user feedback, so as to expand interest personas of the user more efficiently, and improve the diversity of topics in the human-machine conversation.

In order to implement the above embodiments, the present disclosure also provides a sentence recommendation apparatus based on associated points of interest.

Figure 4:
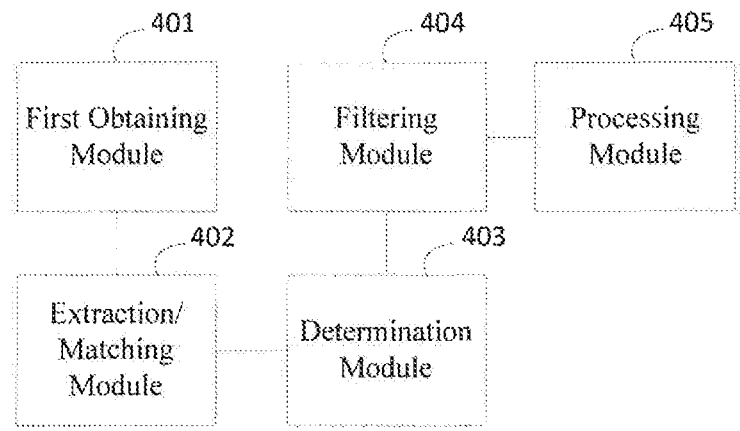
FIG. 4 is a schematic diagram of a sentence recommendation apparatus based on associated points of interest according to an embodiment of the present disclosure.

FIG. 4 illustrates a schematic diagram of a sentence recommendation apparatus based on associated points of interest according to an embodiment of the present disclosure. As illustrated in FIG. 4, the apparatus includes a first obtaining module 401, an extraction and matching module 402, a determination module 403, a filtering module 404, and a processing module 405.

The first obtaining module 401 is configured to obtain an input sentence from a user.

The extraction and matching module 402 is configured to extract a keyword in the input sentence, and to search for a current point of interest matching the keyword in a preset point of interest association network.

The determination module 403 is configured to determine a plurality of associated points of interest matching the current point of interest according to the preset point of interest association network.

The filtering module 404 is configured to filter out an extension point of interest from the plurality of associated points of interest according to a preset filter strategy.

The processing module 405 is configured to retrieve a first reply sentence and a second reply sentence from a preset corpus according to the current point of interest and the extension point of interest, and to provide them to the user.

Figure 5:
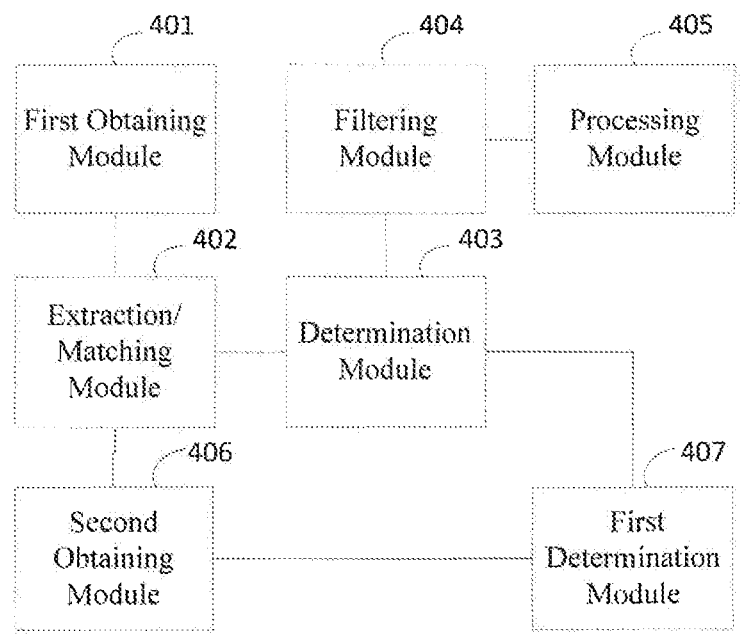
FIG. 5 is a schematic diagram of a sentence recommendation apparatus based on associated points of interest according to another embodiment of the present disclosure.

In an embodiment of the present disclosure, as shown in FIG. 5, and on the basis of FIG. 4, the apparatus further includes: a second obtaining module 406, and a first determination module 407.

The second obtaining module 406 is configured to obtain feedback on interest of the user.

The first determination module 407 is configured to determine whether a retrieval criteria for the extension point of interest is satisfied according to the feedback on interest.

Figure 6:
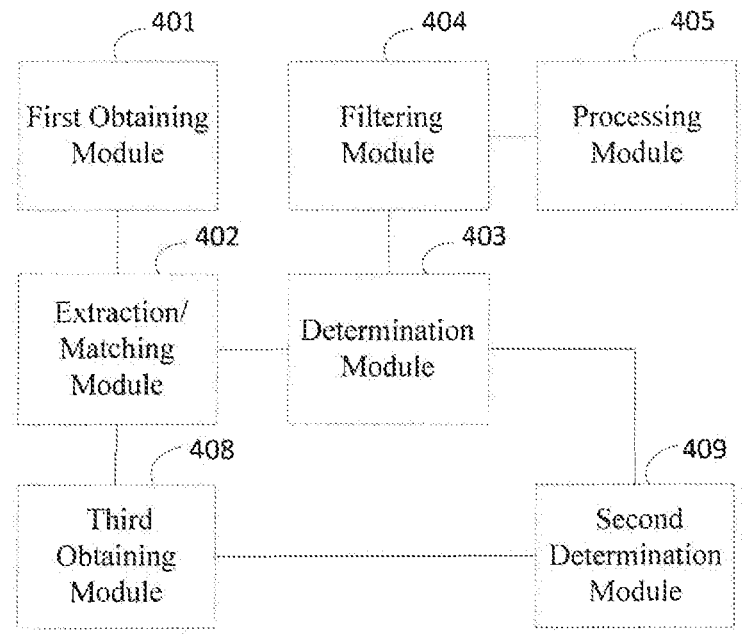
FIG. 6 is a schematic diagram of a sentence recommendation apparatus based on associated points of interest according to a further embodiment of the present disclosure.

In an embodiment of the present disclosure as shown in FIG. 6, and on the basis of FIG. 4, the apparatus further includes: a third obtaining module 408, and a second determination module 409.

The third obtaining module 408 is configured to obtain the number of rounds of talks during human-computer interaction.

The second determination module 409 is configured to determine that a retrieval criteria for the extension point of interest is satisfied when the number of rounds of talks is equal to or greater than a first preset threshold.

Figure 7:
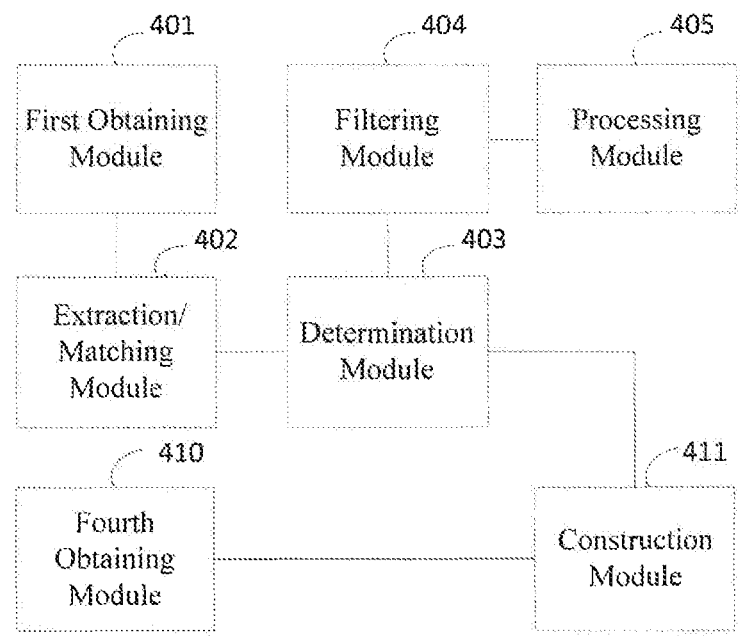
FIG. 7 is a schematic diagram of a sentence recommendation apparatus based on associated points of interest according to another further embodiment of the present disclosure.

In an embodiment of the present disclosure, as shown in FIG. 7, and on the basis of FIG. 4, the apparatus further includes: a fourth obtaining module 410, and a construction module 411.

The fourth obtaining module 410 is configured to obtain a plurality of sentences, and extract a keyword in each sentence.

The construction module 411 is configured to analyze associations among the plurality of keywords, and to construct the preset point of interest association network by setting an association relationship for each of the keywords according to the associations.

In an embodiment of the present disclosure, the filtering module 404 is configured to obtain a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest; and to filter out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

Figure 8:
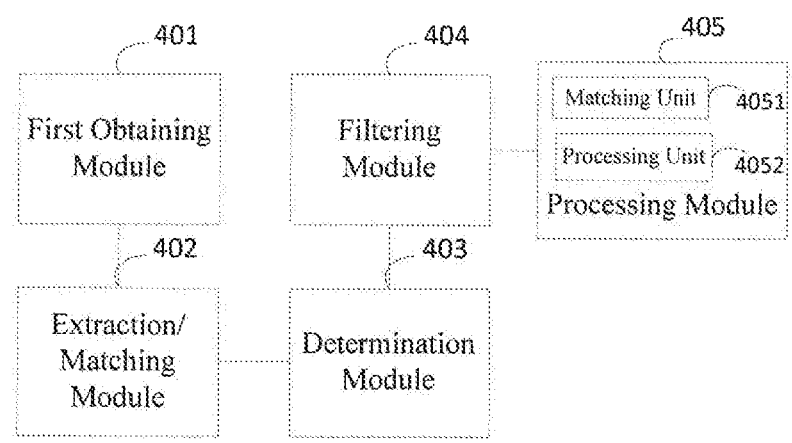
FIG. 8 is a schematic diagram of a sentence recommendation apparatus based on associated points of interest according to still another embodiment of the present disclosure.

In an embodiment of the present disclosure, as shown in FIG. 8, and on the basis of FIG. 4, the processing module 405 includes: a matching unit 4051, and a processing unit 4052.

The matching unit 4051 is configured to obtain a plurality of candidate sentences matching the input sentence from the preset corpus.

The processing unit 4052 is configured to filter out the first reply sentence from the plurality of candidate sentences according to the current point of interest and to provide it to the user.

The processing unit 4052 is further configured to filter out the second reply sentence from the plurality of candidate sentences according to the extension point of interest and to provide it to the user.

The processing unit 4051 is specifically configured to calculate a degree of semantic similarity between the extension point of interest and the plurality of candidate sentences based on a preset semantic model; and to sort the plurality of candidate sentences according to the degree of semantic similarity, to determine the second reply sentence from the plurality of candidate sentences according to the sorted result, and to provide it to the user.

The processing unit 4051 is specifically configured to determine a candidate sentence at the top of the sorted result as the second reply sentence and to provide it to the user; or to determine a target candidate sentence with the sorted result equal to or greater than a second preset threshold and having a sentence length matching that of the input sentence, as the second reply sentence and to provide it to the user.

It should be noted that the foregoing description for the embodiment of the sentence recommendation method based on associated points of interest may also be applicable to the sentence recommendation apparatus based on associated points of interest in the embodiment, details of which are hence omitted herein.

To sum up, the sentence recommendation apparatus based on associated points of interest according to the embodiments of the present disclosure may obtains an input sentence from a user, extracting a keyword in the input sentence, and searching for a current point of interest matching the keyword in a preset point of interest association network, determining a plurality of associated points of interest matching the current point of interest according to the preset point of interest association network, and filtering out an extension point of interest from the plurality of associated points of interest according to a preset filter strategy, and retrieving a first reply sentence and a second reply sentence from a preset corpus according to the current point of interest and the extension point of interest, and providing them to the user. In this way, the sentence recommendation apparatus based on associated points of interest according to the embodiments of the present disclosure may find out an extension point of interest according to associations among different points of interest, provide reply sentences containing the extension point of interest to the user, and then extend a set of points of interest for the user based on the user feedback, so as to expand interest personas of the user more efficiently, and improve the diversity of topics in the human-machine conversation.

In order to implement the above embodiment, the present disclosure also provides a computer device, including: a memory, a processor, and a computer program stored on the memory and operable on the processor, wherein when the computer program is executed by the processor, the sentence recommendation method based on associated points of interest according to embodiments of the first aspect is implemented.

In order to implement the above embodiment, the present disclosure also provides a non-transitory computer readable storage medium having a computer program stored thereon, wherein the computer program is executed by the processor, the sentence recommendation method based on associated points of interest according to embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be implemented by the hardware, software, firmware or their combination. In the above embodiments, a plurality of steps or methods may be implemented by the software or firmware stored in the memory and executed by the appropriate instruction execution system. For example, if it is implemented by the hardware, likewise in another embodiment, the steps or methods may be implemented by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A sentence recommendation method based on associated points of interest, comprising:
    obtaining an input sentence from a user;
    extracting a keyword in the input sentence, and searching for a current point of interest matching the keyword in a preset point of interest association network;
    determining a plurality of associated points of interest matching the current point of interest according to the preset point of interest association network, and filtering out an extension point of interest from the plurality of associated points of interest according to a preset filter strategy; and
    retrieving a first reply sentence and a second reply sentence from a preset corpus according the current point of interest and the extension point of interest, and providing them to the user;
    wherein filtering out the extension point of interest from the plurality of associated points of interest according to the preset filter strategy, comprises:
    obtaining a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest; and
    filtering out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

2. The method as claimed in claim 1, wherein prior to determining the plurality of associated points of interest matching the current point of interest according to the preset point of interest association network, and filtering out the extension point of interest from the plurality of associated points of interest according to the preset filter strategy, further comprises:
    obtaining feedback on interest of the user; and
    determining whether a retrieval criteria for the extension point of interest is satisfied according to the feedback on interest.

3. The method as claimed in claim 1, wherein prior to determining the plurality of associated points of interest matching the current point of interest according to the preset point of interest association network, and filtering out the extension point of interest from the plurality of associated points of interest according to the preset filter strategy, further comprises:
    obtaining the number of rounds of talks during human-computer interaction; and
    determining that a retrieval criteria for the extension point of interest is satisfied when the number of rounds of talks is equal to or greater than a first preset threshold.

4. The method as claimed in claim 1, wherein prior to extracting the keyword in the input sentence, and searching for the current point of interest matching the keyword in the preset point of interest association network, further comprises:
    obtaining a plurality of sentences, and extracting a keyword in each sentence; and
    analyzing associations among the plurality of keywords, and constructing the preset point of interest association network by setting an association relationship for each of the keywords according to the associations.

5. The method as claimed in claim 1, wherein retrieving the first reply sentence and the second reply sentence from the preset corpus according to the current point of interest and the extension point of interest and providing them to the user, comprises:
    obtaining a plurality of candidate sentences matching the input sentence from the preset corpus;
    filtering out the first reply sentence from the plurality of candidate sentences according to the current point of interest and providing it to the user; and
    filtering out the second reply sentence from the plurality of candidate sentences according to the extension point of interest and providing it to the user.

6. The method as claimed in claim 5, wherein filtering out the second reply sentence from the plurality of candidate sentences according to the extension point of interest and providing it to the user, comprises:
    calculating a degree of semantic similarity between the extension point of interest and the plurality of candidate sentences based on a preset semantic model; and
    sorting the plurality of candidate sentences according to the degree of semantic similarity, determining the second reply sentence from the plurality of candidate sentences according to the sorted result, and providing it to the user.

7. The method as claimed in claim 6, wherein determining the second reply sentence from the plurality of candidate sentences according to the sorted result and providing it to the user, comprises:
    determining a candidate sentence at the top of the sorted result as the second reply sentence and providing it to the user; or
    determining a target candidate sentence with the sorted result equal to or greater than a second preset threshold and having a sentence length matching that of the input sentence, as the second reply sentence and providing it to the user.

8. A sentence recommendation apparatus based on associated points of interest, comprising:
one or more processors; and
a storage device, configured to store one or more programs,
wherein, when the one or more programs are executed by the one or more processors, the one or more processors are configured to implement a sentence recommendation method based on associated points of interest, comprising:
obtaining an input sentence from a user;
extracting a keyword in the input sentence, and searching for a current point of interest matching the keyword in a preset point of interest association network;
determining a plurality of associated points of interest matching the current point of interest according to the preset point of interest association network, and filtering out an extension point of interest from the plurality of associated points of interest according to a preset filter strategy; and
retrieving a first reply sentence and a second reply sentence from a preset corpus according to the current point of interest and the extension point of interest, and providing them to the user;
wherein filtering out the extension point of interest from the plurality of associated points of interest according to the preset filter strategy, comprises:
obtaining a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest; and
filtering out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

9. The apparatus as claimed in claim 8, wherein, prior to determining the plurality of associated points of interest matching the current point of interest according to the preset point of interest association network, and filtering out the extension point of interest from the plurality of associated points of interest according to the preset filter strategy, the one or more processors are further configured to:
obtain feedback on interest of the user; and
determine whether a retrieval criteria for the extension point of interest is satisfied according to the feedback on interest.

10. The apparatus as claimed in claim 8, wherein, prior to determining the plurality of associated points of interest matching the current point of interest according to the preset point of interest association network, and filtering out the extension point of interest from the plurality of associated points of interest according to the preset filter strategy, the one or more processors are further configured to:
obtain the number of rounds of talks during human-computer interaction; and
determine that a retrieval criteria for the extension point of interest is satisfied when the number of rounds of talks is equal to or greater than a first preset threshold.

11. The apparatus as claimed in claim 8, wherein, prior to extracting the keyword in the input sentence, and searching for the current point of interest matching the keyword in the preset point of interest association network, the one or more processors are further configured to:
obtain a plurality of sentences, and extracting a keyword in each sentence; and
analyze associations among the plurality of keywords, and constructing the preset point of interest association network by setting an association relationship for each of the keywords according to the associations.

12. The apparatus as claimed in claim 8, wherein when the one or more processors are configured to retrieve the first reply sentence and the second reply sentence from the preset corpus according to the current point of interest and the extension point of interest and provide them to the user, the one or more processors are configured to:
obtain a plurality of candidate sentences matching the input sentence from the preset corpus:
filter out the first reply sentence from the plurality of candidate sentences according to the current point of interest and providing it to the user; and
filter out the second reply sentence from the plurality of candidate sentences according to the extension point of interest and providing it to the user.

13. The apparatus as claimed in claim 12, wherein when the one or more processors are configured to filter out the second reply sentence from the plurality of candidate sentences according to the extension point of interest and provide it to the user, the one or more processors are configured to:
calculate a degree of semantic similarity between the extension point of interest and the plurality of candidate sentences based on a preset semantic model; and
sort the plurality of candidate sentences according to the degree of semantic similarity, determine the second reply sentence from the plurality of candidate sentences according to the sorted result, and provide it to the user.

14. The apparatus as claimed in claim 13, wherein when the one or more processors are configured to determine the second reply sentence from the plurality of candidate sentences according to the sorted result and provide it to the user, the one or more processors are configured to:
determine a candidate sentence at the top of the sorted result as the second reply sentence and provide it to the user; or
determine a target candidate sentence with the sorted result equal to or greater than a second preset threshold and having a sentence length matching that of the input sentence, as the second reply sentence and provide it to the user.

15. A tangible, non-transitory computer readable storage medium having a computer program stored thereon, wherein the computer program is executed by the processor, the program implements a sentence recommendation method based on associated points of interest, comprising:
obtaining an input sentence from a user;
extracting a keyword in the input sentence, and searching for a current point of interest matching the keyword in a preset point of interest association network;
determining a plurality of associated points of interest matching the current point of interest according to the preset point of interest association network, and filtering out an extension point of interest from the plurality of associated points of interest according to a preset filter strategy; and retrieving a first reply sentence and a second reply sentence from a preset corpus according to the current point of interest and the extension point of interest, and providing them to the user;

wherein filtering out the extension point of interest from the plurality of associated points of interest according to the preset filter strategy, comprises:

obtaining a degree of similarity between the plurality of associated points of interest and a set of user interest, a degree of association between the plurality of associated points of interest and the current point of interest, a degree of dissimilarity between the plurality of associated points of interest and a negative set of user interest, and a utilization rate of the plurality of associated points of interest; and filtering out the extension point of interest from the plurality of associated points of interest according to the degree of similarity between the plurality of associated points of interest and the set of user interest, the degree of association between the plurality of associated points of interest and the current point of interest, the degree of dissimilarity between the plurality of associated points of interest and the negative set of user interest, and the utilization rate of the plurality of associated points of interest.

16. The tangible, non-transitory computer readable storage medium as claimed in claim 15, wherein prior to determining the plurality of associated points of interest matching the current point of interest according to the preset point of interest association network, and filtering out the extension point of interest from the plurality of associated points of interest according to the preset filter strategy, further comprises:

obtaining feedback on interest of the user; and determining whether a retrieval criteria for the extension point of interest is satisfied according to the feedback on interest, or obtaining the number of rounds of talks during human-computer interaction; and determining that a retrieval criteria for the extension point of interest is satisfied when the number of rounds of talks is equal to or greater than a first preset threshold, and prior to extracting the keyword in the input sentence, and searching for the current point of interest matching the keyword in the preset point of interest association network, further comprises:

obtaining a plurality of sentences, and extracting a keyword in each sentence; and analyzing associations among the plurality of keywords, and constructing the preset point of interest association network by setting an association relationship for each of the keywords according to the associations.

17. The tangible, non-transitory computer readable storage medium as claimed in claim 15, wherein retrieving the first reply sentence and the second reply sentence from the preset corpus according to the current point of interest and the extension point of interest and providing them to the user, comprises:

obtaining a plurality of candidate sentences matching the input sentence from the preset corpus;

filtering out the first reply sentence from the plurality of candidate sentences according to the current point of interest and providing it to the user; and filtering out the second reply sentence from the plurality of candidate sentences according to the extension point of interest and providing it to the user, wherein filtering out the second reply sentence from the plurality of candidate sentences according to the extension point of interest and providing it to the user, comprises:

calculating a degree of semantic similarity between the extension point of interest and the plurality of candidate sentences based on a preset semantic model; and sorting the plurality of candidate sentences according to the degree of semantic similarity, determining the second reply sentence from the plurality of candidate sentences according to the sorted result, and providing it to the user, and wherein determining the second reply sentence from the plurality of candidate sentences according to the sorted result and providing it to the user, comprises:

determining a candidate sentence at the top of the sorted result as the second reply sentence and providing it to the user; or determining a target candidate sentence with the sorted result equal to or greater than a second preset threshold and having a sentence length matching that of the input sentence, as the second reply sentence and providing it to the user.

\* \* \* \* \*